United States Patent
Doering

(10) Patent No.: US 11,692,737 B2
(45) Date of Patent: Jul. 4, 2023

(54) CERVID SKULL BOILER

(71) Applicant: BRIDGER BOILER LLC, Litchfield, MN (US)

(72) Inventor: Eric Doering, Litchfield, MN (US)

(73) Assignee: Bridger Boiler LLC, Litchfield, MN (US)

( * ) Notice: Subject to any disclaimer, the term of this patent is extended or adjusted under 35 U.S.C. 154(b) by 409 days.

(21) Appl. No.: 16/853,687

(22) Filed: Apr. 20, 2020

(65) Prior Publication Data

US 2020/0333042 A1 Oct. 22, 2020

Related U.S. Application Data

(60) Provisional application No. 62/835,590, filed on Apr. 18, 2019.

(51) Int. Cl.
| | |
|---|---|
| *F24H 1/06* | (2022.01) |
| *B29C 33/38* | (2006.01) |
| *A47G 33/00* | (2006.01) |
| *B44C 5/02* | (2006.01) |

(52) U.S. Cl.
CPC ............ *F24H 1/06* (2013.01); *B29C 33/3857* (2013.01); *A47G 33/004* (2013.01); *B29C 2033/3871* (2013.01); *B44C 5/02* (2013.01)

(58) Field of Classification Search
CPC ......... F24H 1/06; F24H 1/20; B29C 33/3857; B29C 2033/38; B44C 5/02; A47G 33/004
See application file for complete search history.

(56) References Cited

U.S. PATENT DOCUMENTS

| | | | | |
|---|---|---|---|---|
| 121,770 | A * | 12/1871 | French | B65D 47/06 222/481 |
| 4,106,486 | A * | 8/1978 | Lee | A47J 27/04 126/369 |
| 4,709,827 | A * | 12/1987 | Jaillet | B65D 11/188 220/4.03 |
| 4,881,520 | A | 11/1989 | Hefling | |
| 5,711,210 | A * | 1/1998 | Kaufman | A47J 36/24 99/449 |
| 6,725,856 | B1 | 4/2004 | Barbour et al. | |
| 7,325,482 | B1 * | 2/2008 | Bourgeois | A47J 43/18 99/482 |
| 7,766,004 | B1 | 8/2010 | Bourgeois | |

(Continued)

OTHER PUBLICATIONS

Sullivan, et al. "Cleaning and Preserving Animal Skulls" *The University of Arizona Cooperative Extension* (Oct. 1999) 4 pages.

*Primary Examiner* — Steven S Anderson, II
(74) *Attorney, Agent, or Firm* — Christensen, Fonder, Dardi & Herbert PLLC; Douglas J. Christensen

(57) ABSTRACT

A portable skull boiler in accordance with embodiments has a boiler basin optimally sized and configured for effective cleaning of cervid heads, with head positioning means, nose submersion means, and three or more adjustable and removable legs. The basin has one or more lids, and an adjustably positionable heat source. The skull boiler may be disassembled with all components securable in the boiler basin for transport and storage. The basin having a non rectilinear shape that conformingly receives and retains cervid heads thereby minimizing the size and volume of the basin facilitating efficient operation using minimal fuel and water, and easy transport.

20 Claims, 9 Drawing Sheets

(56) References Cited

U.S. PATENT DOCUMENTS

| | | | |
|---|---|---|---|
| 7,770,514 B1 * | 8/2010 | Bourgeois | A47J 36/20 |
| | | | 99/403 |
| 8,162,670 B2 | 4/2012 | Hacke | |
| 8,939,771 B2 | 1/2015 | Owens, III | |
| 10,041,277 B1 * | 8/2018 | Bourgeois | A47J 36/26 |
| 2006/0154224 A1 | 7/2006 | St. Ama | |
| 2009/0075245 A1 | 3/2009 | Hacke | |
| 2013/0014373 A1 | 1/2013 | Jordan | |

* cited by examiner

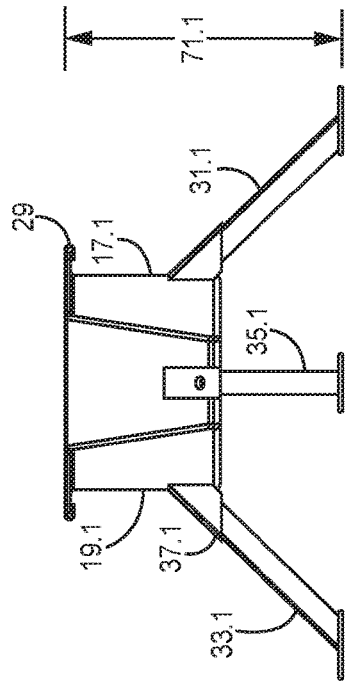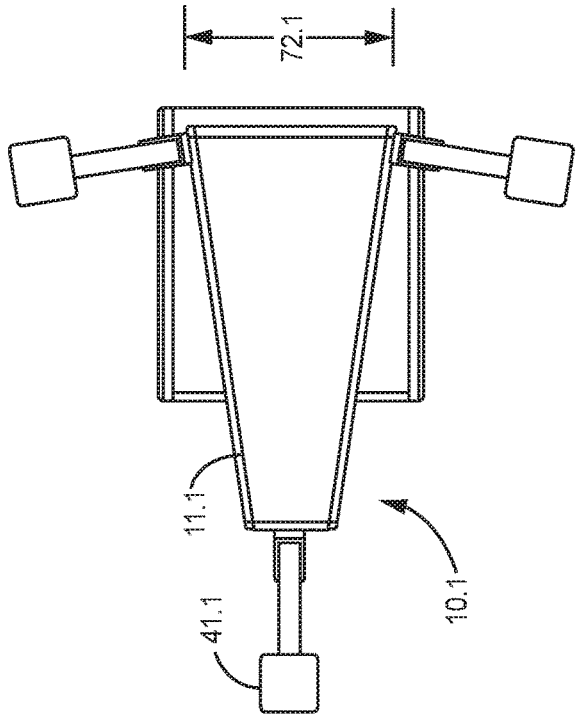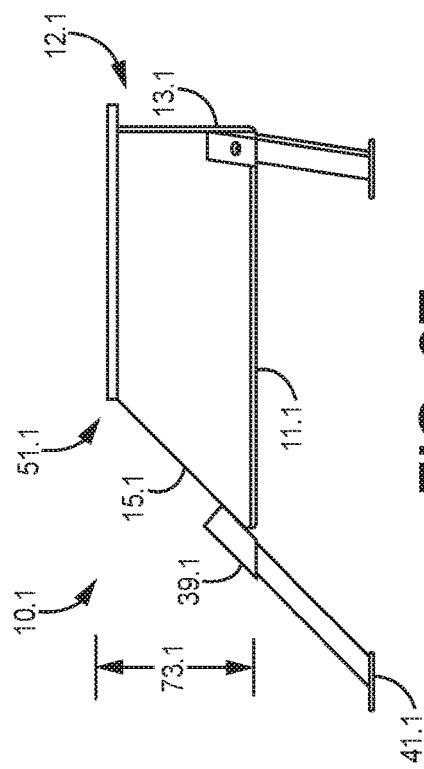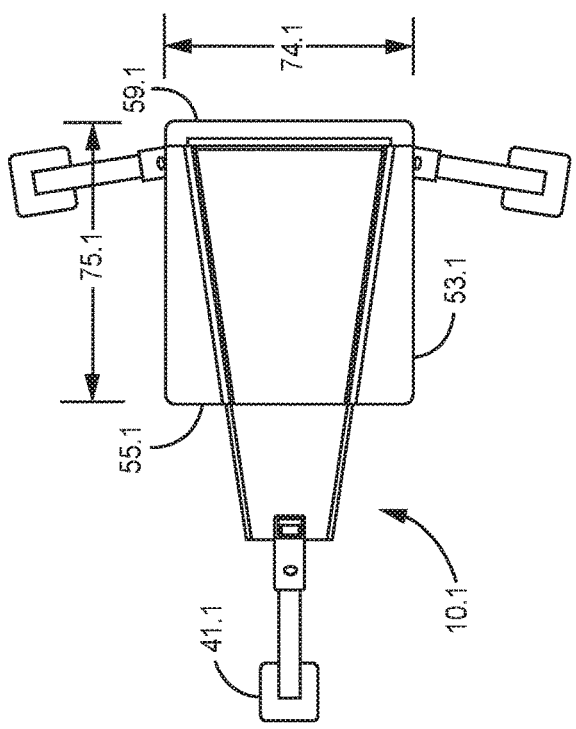

CERVID SKULL BOILER

CROSS REFERENCE TO RELATED APPLICATIONS

This application claims priority to U.S. Provisional Application No. 62/835,590 filed on Apr. 18, 2019. The contents of said application are incorporated herein by reference.

FIELD OF THE DISCLOSURE

This invention relates to hunting. More specifically, this invention relates to the removal of tissue and other biological material from an animal skull.

BACKGROUND

Hunters commonly keep a portion of their prey to display as a trophy. A popular style of trophy display is the European mount. In this style of display, a bare animal skull is mounted. If an animal has horns or antlers, those will generally be displayed with the skull. Boiling a skull is one method to remove flesh and other biological materials. Conventionally large round or cylindrical pots, or turkey fryers are utilized for such boiling. An improved apparatus for boiling skulls would be well received by the industry.

SUMMARY

Hunters traditionally enjoy displaying the skull and antlers of male cervids. However, many Western states have banned crossing state lines with cervid spinal tissue or brain matter in an effort to stop the spread of disease such as chronic wasting disease. More states are adopting similar measures as disease spreads. 41 states and 8 Canadian providences have laws regulating the transportation of cervid body parts including heads and skulls from Elk, Whitetail, Mule deer, Moose, and Caribou. This leaves hunters with three primary choices. The first option is to keep only the horns as a trophy and dispose of the skull with the rest of the carcass. The second option is to bring the skull to a local taxidermist to remove the tissue and brain matter, at some expense to the hunter. This may require crating and shipping the finished product back to the hunter, adding to the expense of this option and risking damage in transit.

Finally, a hunter might attempt to clean the skull at the kill site. However, current systems for boiling skulls are not well suited to this task. Many hunters use barrels or turkey fryers to boil skulls. These systems are not readily portable and are fraught with additional problems. Most of these systems are not large enough to accommodate larger skulls such as cervid skulls like elk that are commonly found in Western hunting grounds. Those boiling systems that are large enough to accommodate larger skulls are cumbersome to transport and not properly sized for the animal's head. Improper sizing leads to several drawbacks. For example, the horns may either slip into the water or be otherwise steamed, resulting in undesirable whitening of all or portions of the horns. The inventor has observed that such an oversized vessel requires excess water, thereby requiring more time and more fuel to heat and completely boil the biological matter away from the skull. In some instances, hunters travel great distances on foot and, at times, through extremely harsh conditions such as treacherous terrain or extreme weather. Transporting large basins in these conditions is extremely difficult, and bringing sufficient fuel to properly clean a skull in an oversized reservoir may be impracticable. A standard turkey fryer might deplete a 20 lb. propane tank in just a few hours. In most situations, it is not feasible for a hunter to transport 20 lb. tanks while tracking their prey through inhospitable conditions. Moreover, these basins offer no flexibility in positioning the skull in the basin, for accommodating different sizes of skulls, or for keeping the skull submerged in the boiling water. Moreover such basins have no flexibility in positioning the basin, nor for easily adjusting the position of the heat source thereunder.

A portable skull boiler in accordance with embodiments has a boiler basin optimally sized and configured for effective cleaning of cervid heads, with head positioning means, and nose submersion means. The basin has one or more lids, and an adjustably positionable heat source. In embodiments, the portable skull boiler may have three or more adjustable and removable legs. The skull boiler may be disassembled with all components securable within the boiler basin for transport and storage.

In embodiments, the basin is conformingly shaped to the shape of cervid heads. The basin has a front wall, a rearward wall, two lateral walls, and a bottom wall defining a basin interior. A lip extends around the upper portion of each of the four walls at an open top and defines the open top. In embodiments, the walls are planar and polygonal allowing easy fabrication such as by welding. When set up for use the lip defining the open top is horizontal and the base sloped such that a forward end of the basin is deeper than a rearward end of the basin. The front wall and bottom wall defining an acute angle in the interior of the basin.

In embodiments, a portable skull boiler has an elongate boiler basin with a forward nose end and a rearward back-of-head end, which when set up for use has a horizontal upper lip defining an open top. The basin having a primary convergence towards the nose end. In embodiments, the basin may have a secondary convergence at the back-of-head end, the convergence at the primary nose end greater than the convergence at the back-of-head end. The "convergence" defined as the incremental decrease in cross-sectional area taken at a vertical plane perpendicular to an elongate axis when the basis is set up for use. The cross sectional area defined by a bottom wall, a pair of side walls and a top wall or the open top defined by the lip. In embodiments, in the use position, the nose end is lower than the back-of-head end. In embodiments, the bottom wall is sloped such that a forward end of the basin is deeper than a rearward end of the basin. This sloped bottom on the boiling pot also directs the "rolling boil" up the back side of the skull were more agitation is needed to loosen up brain tissue.

The boiler basin includes a lip around the upper periphery. In embodiments, the lip is configured to support one or more lid panels that can close the basin for transport and storage, and that can partially close the basin when in use.

An antler/horn support is adjustably positionable at the top the open top and has a crossing portion configured as a bar that is raised from the lip of the basin. A pair of arms with eyelets may be removably attached to the lip with the horn support bar extending therebetween. In embodiments, the horn support arms have a threaded portion at an end opposite the eyelet whereby the arms may be secured to the lips with fastening means. Examples of fastening means for the support arms includes butterfly nuts and the like.

In embodiments, each of the legs is removably attached to the boiler basin, such as by the legs plugging into conforming sockets or receptacles, and at least one leg includes a burner support arm. A burner may be removably attached to the burner support arm. When attached, a burner head is directed toward the boiler basin at the bottom wall. In embodiments, the basin has a single front leg receptacle fixedly attached to the boiler basin. In embodiments, the leg receptacles and legs are tubular, such as square tubes or circular tubes. One receptacle is mounted to the basin front at the front sloped wall and two receptacles may be mounted at the basin rear at the lateral walls or the rearward wall or to the base.

In embodiments, a lid may rest atop the lip of the boiler basin. In embodiments, the lid may comprise two or more panels. In embodiments, the lid may be secured to the lip and may include one or more handles. In embodiments, the lid may have a flange along outer edges configured to slidingly engage the lip of the boiler basin. In embodiments, the boiler basin may include one or more handles. In embodiments, lid panels may be used to shield the horns from the boiling water and steam. The lid panels may be removable and/or hinged.

In embodiments, a portable skull boiler includes a propane tank. The burner may connect to the propane source via flexible tubing connecting to the burner. When the propane tank is on, gas may flow from the tank towards a burner head. The burner head is adjustably directed at the boiler basin.

According to embodiments, a method of transitioning a portable skull boiler from a stowed configuration to a use configuration includes providing a portable skull boiler; securing each of the three or more legs to the boiler basin such that the burner support arm extends generally towards a central point of the boiler basin; securing the burner to the burner support arm; securing the horn support to the lip, and connecting the propane source to the burner.

According to embodiments, a method of using a portable skull boiler includes providing a portable skull boiler; transitioning the portable skull boiler to a use configuration; providing an animal skull; placing the animal skull in the boiler basin with the nose portion positioned in the deep part of the basin; adjusting a front leg of the portable skull boiler to a desired height; adjusting the horn support bar to a desired position; and filling the boiler basin with water up to a desired level. In embodiments, a method of using a portable skull boiler may further include placing additives in the boiler basin. In embodiments, a method of using a portable skull boiler may further include providing a propane tank; and attaching the propane tank to the burner. In embodiments, a method of using a portable skull boiler may further include igniting the burner; and permitting the water to boil to remove biological material no longer affixed to the animal skull. The water may be periodically dumped, by tilting the boiler about the rearward legs, and then more water added during the processing. In embodiments, a method of using a portable skull boiler may further include removing the clean skull from the portable skull boiler; disposing of the contents of the boiler basin; and cleaning the portable skull boiler.

Examples of fixed attachments for purposes of this disclosure may include any combination of welds, rivets, nails, glues, adhesives, and the like. Examples of removable attachments for purposes of this disclosure may include any combination of screws, butterfly nuts, lugs, bolts, hook and loop, and the like, in addition to associated components such as washers or nuts. In embodiments, a portable skull boiler can comprise alumina, aluminum alloys, magnesium alloys, steel, or other sheet metals or alloys known to one skilled in the art. Aluminum tubes can be extruded, drawn, or manufactured through other processes known in the art. In some embodiments, tubes or receptacles that are not capable of receiving other tubes may be replaced with solid structures. In some embodiments, tubes may be formed of wood or wood products. In embodiments, front, left rear, and rear legs formed from solid hardwood are not beyond the scope of this disclosure. Boiler basin may be formed from a single sheet of metal folded to the desired shape. Portions of boiler basin may be welded or otherwise sealed through means known to one skilled in the art, creating a generally watertight vessel. In embodiments, portions of a portable skull boiler may be coated with non-stick materials. Examples of non-stick materials for purposes of this disclosure may include polytetrafluoroethylene (PTFE) formulas and the like.

In embodiments, the portable skull boiler has a height, as measured from the foot plate to the lip, between 1 foot and 3 feet. In embodiments the portable skull boiler has a height between 6 inches and 18 inches. In embodiments, the portable skull boiler has a height of one foot and eight inches. In embodiments, the portable skull boiler has a height of about 9 inches. In embodiments, the boiler basin has a height, as measured along an axis parallel to the height of the portable skull boiler, between 6 inches and 2 feet. In embodiments, the boiler basin has a height between 3 and 12 inches. In embodiments, the boiler basin has a height of 10 inches. In embodiments, the boiler basin has a height of about 5 inches. In embodiments, the boiler basin has a top length, as measured from the front lip to the rear lip, between six inches and three feet. In embodiments, the boiler basin has a top length between 6 inches and 2 feet. In embodiments, the boiler basin has a top length of about 16 inches. In embodiments the boiler basin has a top length of about 9.75 inches. In embodiments, the boiler basin has a lower length, as measured from the intersection of the bottom panel and the front and rear walls, along an axis parallel to the top length, of between 1 foot and 3 feet. In embodiments, the boiler basin has a lower length of about 20 inches. In embodiments, the boiler basin has a width as measured between the left and right side walls of between 6 and 20 inches. In embodiments, the rear wall of the boiler basin has a width, measured from the left side wall of the boiler basin to the right side wall of the boiler basin, between 4 inches and 12 inches. In embodiments, the rear wall has a width of about 7 inches. In embodiments, the base wall of the boiler basin is about 4 inches off the ground when the fixed removable legs are inserted into their respective receptacles. In embodiments, the boiler basin has a volume of between 1000 and 2000 cubic inches. In embodiments, the boiler basin has a volume of between 1500 and 3000 cubic inches. In embodiments, the boiler basin has a volume between 300 and 800 cubic inches. In embodiments, the boiler basin has a volume between 400 and 1000 cubic inches.

In embodiments, a wind screen may be used to protect the flame from wind on at least three sides. A wind screen may have two side panels and a front panel. In embodiments, the side panels are of similar size and shape and the front panel spans between the two side panels. In embodiments, the front panel and side panels are hingedly connected such that the wind screen may fold flat. In embodiments, the wind screen may be sized such that it fits within the basin when folded flat. In embodiments, the front panel is sized such that it extends from the ground to the bottom wall. In embodiments, the side panels are sized such that they extend slightly higher than, and overlap, the side walls of the basin. A wind screen may comprise alumina, aluminum alloys, magnesium alloys, steel, or other sheet metals or alloys known to one skilled in the art.

A feature and advantage of embodiments is the forward deeper end of the basin is sized for receiving and retaining the nose portion of a cervid head, and when the horn bar is positioned rearward of the horns, the cervid head is generally in a retainable position although movable in the water. That is, the nose portion will stay forward being constrained between the forward wall and bottom wall and pushed into the acute angle defined by these walls. In embodiments, the nose is further, or alternately, secured with nose hold-down, such as an adjustable bar spanning the forward interior of the basin intermediate a column of bar end receiving positions. Other submersion means may be utilized.

A feature and advantage of the disclosure is having a boiler basin sized appropriately for an animal skull requires less water than an oversized basin, thereby saving time and propane gas.

A feature and advantage of the disclosure is that having a support mechanism for the horns keep the cervid skull optimally positioned in the basin during the boiling, helps prevent the horns from tipping out of the pot and catching fire, and keeps the skull positioned and secured in the basin when the boiling fluid is poured out.

A feature and advantage of the disclosure is the ability to adjust the positioning of the height of the skull and horns keeping the skull submerged, thereby offering improved and more expedient cleaning of the skull, while keeping the antlers out of the water, thereby preventing an undesirable whitening or discoloration of the horns.

A feature and advantage of the disclosure is the lid or lids may be used to prevent steam from covering and/or discoloring the antlers. A feature and advantage is the lids may retain heat, thereby reducing boiling time and gas consumption. A feature and advantage of the disclosure is a sturdy boiler is less prone to tipping preventing accidental fires or burns from boiling water.

BRIEF DESCRIPTION OF THE DRAWINGS

FIG. 2E is a left side view of a portable skull boiler according to an embodiment of the disclosure.

FIG. 2F is a back view of a portable skull boiler with a lid according to an embodiment of the disclosure.

FIG. 2G is a top view of a portable skull boiler without a lid according to an embodiment of the disclosure.

FIG. 2H is a bottom view of a portable skull boiler with a lid removed according to an embodiment of the disclosure.

DETAILED DESCRIPTION

Figures 1A, 1B, 1C, 1D:
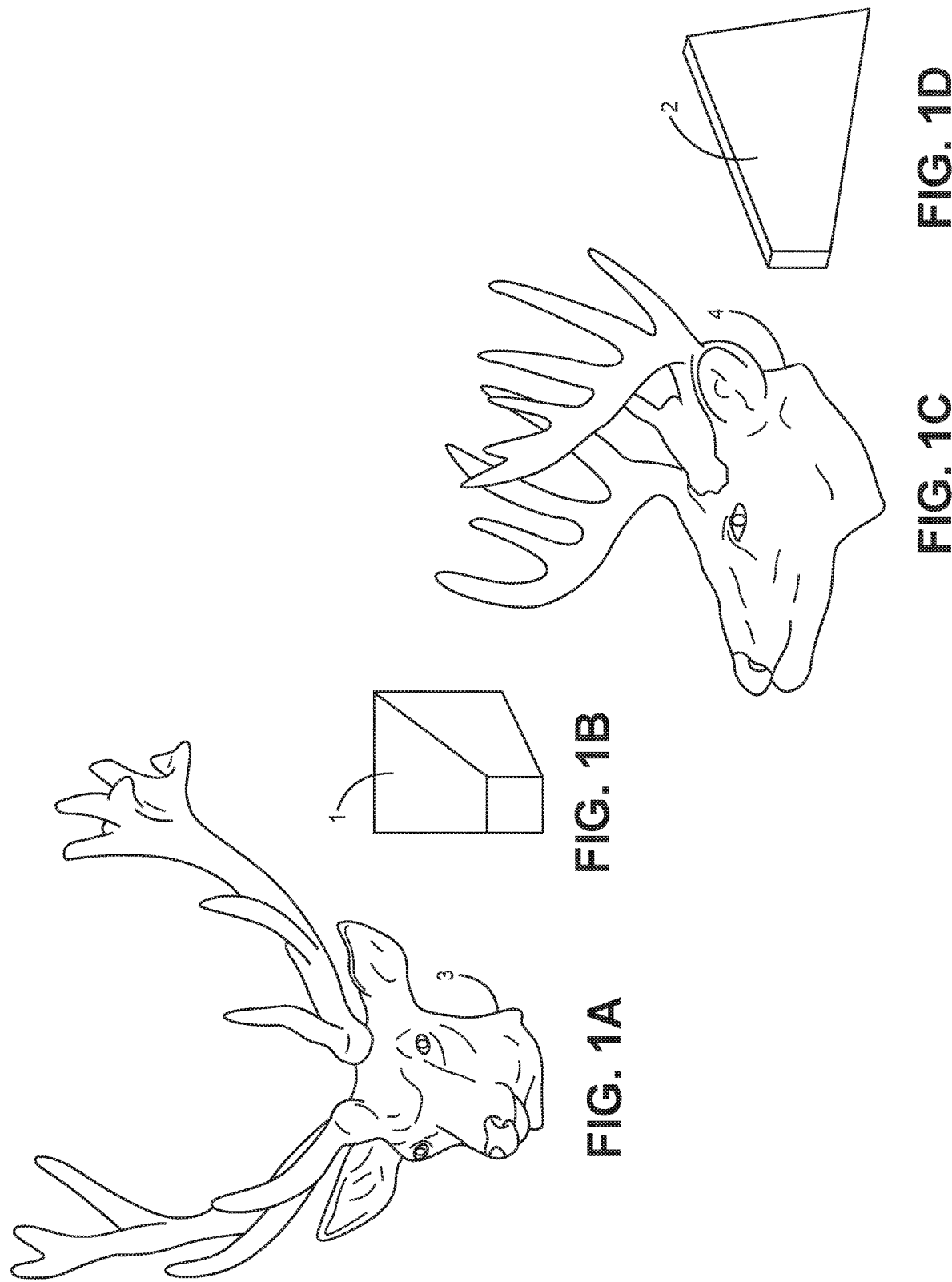
FIG. 1A is a perspective view of a cervid head.
FIG. 1B is a truncated pyramid shape that reflects the shape of the cervid head of FIG. 1A.
FIG. 1C is a perspective view of a cervid head.
FIG. 1D is a perspective view of a truncated pyramid shape that reflects the shape of the cervid head of FIG. 1C.
Figure 1E:
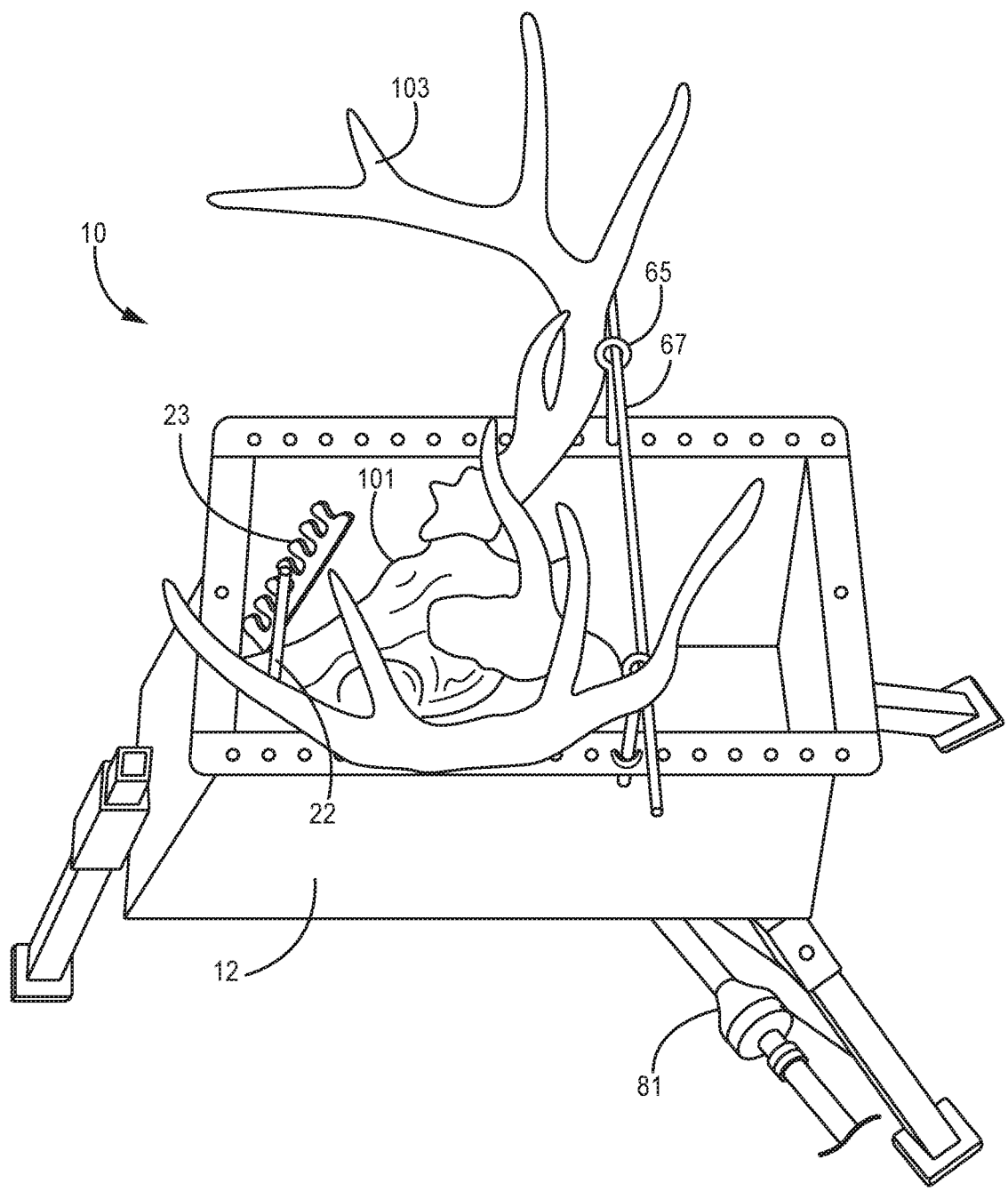
FIG. 1E is a perspective front view of a portable skull boiler according to an embodiment of the disclosure.
Figure 2A:
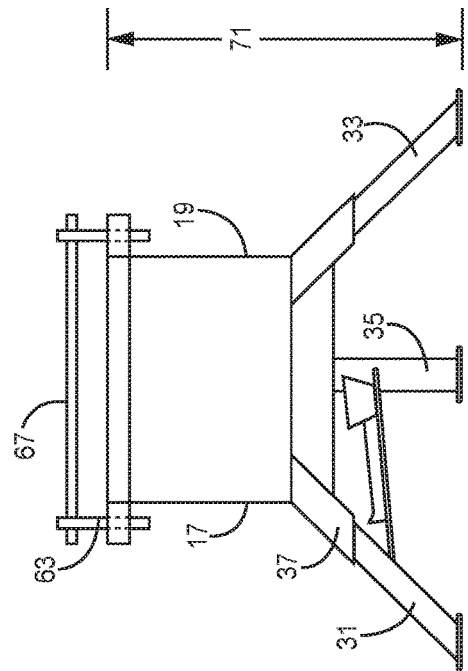
FIG. 2A is a left side view of a portable skull boiler according to an embodiment of the disclosure.
Figure 2B:
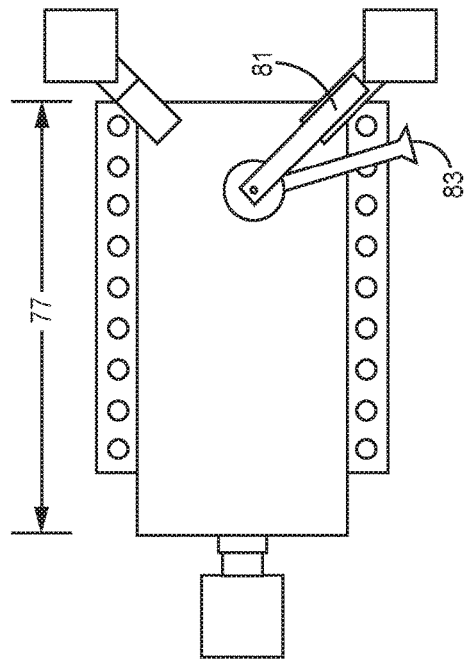
FIG. 2B is a back view of a portable skull boiler according to an embodiment of the disclosure.
Figure 2C:
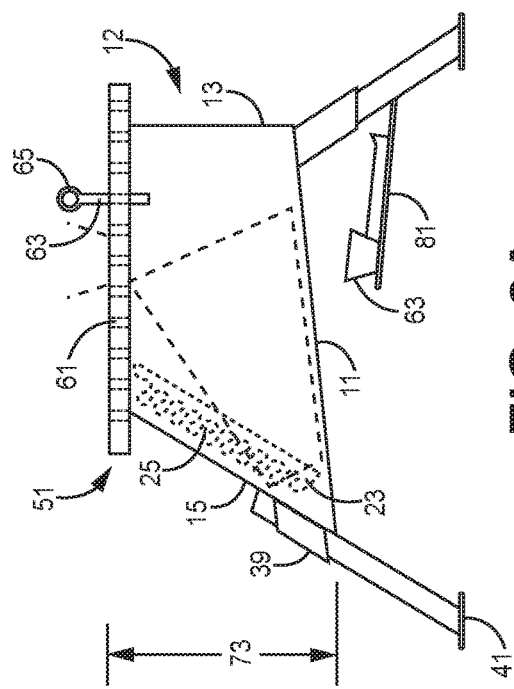
FIG. 2C is a top view of a portable skull boiler according to an embodiment of the disclosure.
Figure 2D:
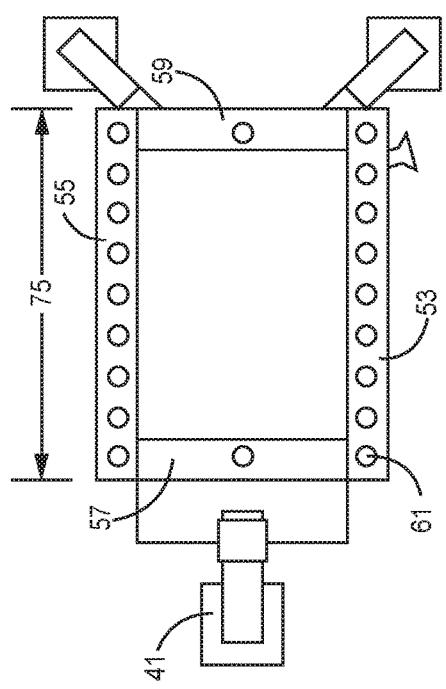
FIG. 2D is a bottom view of a portable skull boiler according to an embodiment of the disclosure.

Referring to FIGS. 1A to 1D, relative shapes 1, 2 of cervid heads 3, 4 are illustrated. FIGS. 1A-2A, illustrate the relative fit of such heads in a portable skull boiler 10 with a boiler basin 12. FIG. 2A in particular illustrates how the truncated portion of the geometric shape, corresponding to the nose portion, is accommodated by the prismatic configuration of the basin 12. FIG. 1E depicts a perspective view of a cervid skull 101 positioned within the basin 12 of a fully assembled portable skull boiler 10.

Referring to FIGS. 2A-2D, boiler basin 12 includes a sloped bottom wall or base 11, a back wall 13, a sloped front wall 15, a left side wall 17, a right side wall 19. A portable skull boiler 10 may be supported by one or more legs. In an embodiment, a portable skull boiler 10 has a left rear leg 31, a right rear leg 33, and a front leg 35. A tubular rear leg receptacle 37 may be fixedly attached to the boiler basin 12. In embodiments, tubular rear leg receptacle 37 is fixedly attached to sloped base 11. An upper portion of left or right rear leg 31, 33 may be removably attached to tubular rear leg receptacle 37. A tubular front leg receptacle 39 may be fixedly attached to boiler basin 12. In embodiments, tubular front leg receptacle 39 is fixedly attached to sloped front wall 15. Front leg 35 may be removably attached to front leg receptacle 39. In embodiments, front leg 35 may have a plurality of attachment points. In embodiments, tubular front leg receptacle 39 may allow front leg 35 to slide through, allowing a user to adjust the tilt of portable skull boiler 10 through the selection of attachment point on the front leg 35. The bottom of front, left rear, and right rear legs 31, 33, 35 may be fixedly attached to foot plate 41 for additional stability. In embodiments, left rear leg 31 and right rear leg 33 are the same size and may be interchangeable. In embodiments, front leg 35 is shorter than rear legs 31, 33. In embodiments, legs 31, 33, 35 include detent pins configured to releasably engage with corresponding apertures in leg receptacles 37, 39.

The shape of the interior basin 12 defined by the walls, generally conforms to the prismatic shape of a cervid skull 101, allowing the snout to fit snugly towards the intersection of sloped base 11 and sloped front wall 13. While the sloped nature of the forward portion decreases the overall internal volume of basin 12, thereby reducing the amount of water and fuel required, it also retains heat around skull 101. Further, the snug fit assists in retaining the snout portion of skull 101 within boiler basin 12, particularly when boiling, so that skull 101 stays submerged in the water and properly positioned.

Left rear leg 31 may include burner support arm 81. In embodiments, burner support arm 81 may be integral with left rear leg 31. In embodiments, burner support arm 81 may be fixedly attached to left rear leg 31. In embodiments, burner support arm 81 may be removably attached to left rear leg 31. In embodiments, burner support arm 81 may be attached to right rear leg 33. In embodiments, burner support arm 81 may be attached to front leg 35. In embodiments, a portable skull boiler 10 may have more than one burner support arm 81. In embodiments, burner 83 is removably attached to burner support arm 81. In embodiments, burner 83 is a propane burner.

Examples of fixed attachments for purposes of this disclosure may include any combination of welds, rivets, nails, glues, adhesives, and the like. Examples of removable attachments for purposes of this disclosure may include any combination of screws, butterfly nuts, lugs, bolts, hook and loop, and the like, in addition to associated components such as washers or nuts. In embodiments, a portable skull boiler can comprise alumina, aluminum alloys, magnesium alloys, steel, or other sheet metals or alloys known to one skilled in the art. Aluminum tubes can be extruded, drawn, or manufactured through other processes known in the art. In some embodiments, tubes or receptacles that are not capable of receiving other tubes may be replaced with solid structures. In some embodiments, tubes may be formed of wood or wood products. For example, front, left rear, and right rear legs 31, 33, 35 formed from solid hardwood are not beyond the scope of this disclosure. Boiler basin 12 may be formed from a single sheet of metal folded to the desired shape. For example, sloped base 11, a back wall 13, a sloped front wall 15, a left side wall 17, a right side wall 19 may be cut from a template using a unitary single sheet of planar material. The walls may then be bent into the desired position. This method of manufacture is generally less expensive than competing methods and readily adaptable to mass production. Further, the planar walls offer numerous advantages to the curved walls of traditional pots. For example, the planar walls may conform to the generally prismatic shape of a cervid skull, may better accommodate other boiler components in a stowed configuration, and may be easier to pack alongside other hunting gear such as rectangular coolers. Portions of boiler basin 12 may be welded or otherwise sealed through means known to one skilled in the art, creating a generally watertight vessel.

A top edge of boiler basin 12 may have a lip 51 capable of supporting lid 29. Lip 51 includes a left lip edge 53, a right lip edge 55, a front lip edge 57, and a back lip edge 59. Lip 51 may have one or more lip apertures 61. In embodiments, lip apertures 61 are threaded. Lip apertures 61 on the front and back lip edges 57, 59 may be configured to secure lid 29. Horn support may comprise horn support arms 63, which may be removably attached to lip 51. In embodiments, horn support arms 63 may have a lower threaded portion and an upper portion with an eyelet 65. In embodiments, horn support arms 63 may be an eyebolt. In embodiments, a first horn support arm 63 may be attached to left lip edge 53 opposite a second horn support arm 63 attached to right lip edge 55. Horn support bar 67 may be inserted through the eyelets 65 of first and second horn support arms 63. One skilled in the art will appreciate that the height of the horn support arm 63 may be adjusted by controlling how far the horn support arm 63 is inserted through lip 51. In embodiments, the height of horn support arm 63 may be controlled through the use of removable attachment means such as butterfly nuts. A horn support arm 63 having two butterfly nuts, one placed above and one placed below lip 51, may be securely fastened at the desired height. In embodiments where aperture 61 and the lower portion of horn support arm 63 are each threaded, the height may be adjusted by rotating horn support arm 63 until it reaches the desired position. Moving the horn support arm 63 towards the front or rear of boiler basin 12 while also adjusting the height permits a user to set the optimal position of horn support bar 67. In embodiments, horns 103 may be anchored to horn support bar 67. Animal skulls, and particularly horns, include a wide variety of sizes and shapes. Adjusting the horn support bar 67 permits the user to properly boil the skull while maintaining the desired aesthetic appearance of the horns. In embodiments, other horn supports may be utilized such as flexible members, such as wire, or steel bands, or plastic bands. Such supports may cooperate with the apertured lip portions strips.

In embodiments, portable skull boiler 10 has a height 71, as measured from the foot plate to the lip, between 1 foot and 3 feet. In embodiments, portable skull boiler 10 has a height 71 of one foot and eight inches. In embodiments, the boiler basin 12 has a boiler basin height 73, as measured along an axis parallel to the height of the portable skull boiler, between 6 inches and 2 feet. In embodiments, the boiler basin height 73 is about 10 inches. In embodiments, the boiler basin 12 has a top length 75, as measured from the front lip 57 to the rear lip 59, between six inches and three feet. In embodiments, the boiler basin 12 has a top length 75 of about 16 inches. In embodiments, the boiler basin 12 has a lower length 77, as measured from the intersection of the sloped base 11 and the front and rear walls 15, 13, along an axis parallel to the top length 75, of between 1 foot and 3 feet. In embodiments, the boiler basin 12 has a lower length 77 of about 20 inches.

A nose submersion means comprising a nose hold-down 22 in the interior of the basin may comprise a first ladder 23 is permanently affixed to an interior surface of left side 17 and a second ladder 23 is permanently affixed to an interior surface of right side 19. The first and second ladders 23 are affixed opposite one another and extend from sloped base 11 towards lip 51. In embodiments, ladder 23 may be generally parallel to sloped front wall 15. Ladder 23 defines one or more rungs 25 configured to receive nose bar 27. Nose bar 27 may be positioned in coordination with horn support bar 67 to ensure that skull 101 is properly positioned in boiler basin 12. Nose bar 27 may be moved to ensure that skull 101 is fully submerged in water. Nose bar 27 may be positioned to prevent skull 101 from floating or being knocked out of boiler basin 12 when the water is boiling. In embodiments, the nose submersion means may be the walls of the basin configured to hold down the nose below the expected boiling water level in the basin.

Cervid skull and antler size may vary considerably between species. For example, Elk may have much larger skulls and/or antlers than whitetail deer. Accordingly, in embodiments, dimensions and the overall prismatic shape of portable skull boiler 10 may be modified to accommodate particular families, genus, or species of cervids. FIGS. 2E-2H illustrate a portable skull boiler 10.1 which may be suited to particular cervids such as whitetail deer or the like.

Referring to FIGS. 2E-2H, boiler basin 12.1 includes base 11.1, a back wall 13.1, a sloped front wall 15.1, a left side wall 17.1, and a right side wall 19.1. In embodiments, base 11.1 may taper from back to front such that base 11.1 is narrower where it joins sloped front wall 15.1 than where it joins back wall 13.1. A portable skull boiler 10.1 may be supported by one or more legs. In an embodiment, a portable skull boiler 10 has a left rear leg 31.1, a right rear leg 33.1, and a front leg 35.1. A tubular rear leg receptacle 37.1 may be fixedly attached to the boiler basin 12. In embodiments, a first tubular rear leg receptacle 37.1 is fixedly attached to left side wall 17.1 and a second tubular rear leg receptacle 37.1 is fixedly attached to right side wall 19.1. An upper portion of left or right rear leg 31.1, 33.1 may be removably attached to tubular rear leg receptacle 37.1. In embodiments where the front the front of boiler basin 12.1 is narrower than the rear, left and right side walls 15.1, 17.1 are not parallel. Accordingly, in such embodiments, left or right rear leg 31.1, 33.1 may be angled slightly towards the front of boiler basin 12.1. A tubular front leg receptacle 39.1 may be fixedly attached to boiler basin 12. In embodiments, tubular front leg receptacle 39.1 is fixedly attached to sloped front wall 15. Front leg 35.1 may be removably attached to front leg receptacle 39.1. In embodiments, front leg 35.1 may have a plurality of attachment points. In embodiments, tubular front leg receptacle 39.1 may allow front leg 35.1 to slide through, allowing a user to adjust the tilt of portable skull boiler 10 through the selection of attachment point on the front leg 35.1. The bottom of front, left rear, and right rear legs 31.1, 33.1, 35 may be fixedly attached to foot plate 41 for additional stability. In embodiments, left rear leg 31.1 and right rear leg 33.1 are the same size and may be interchangeable. In embodiments, front leg 35.1 is shorter than rear legs 31.1, 33.1. In embodiments, legs 31.1, 33.1, 35.1 include detent pins configured to releasably engage with corresponding apertures in leg receptacles 37.1, 39.1.

A top edge of boiler basin 12.1 may have a lip 51.1 capable of supporting lid 29. Lip 51.1 includes a left lip edge 53.1, a right lip edge 55.1, and a back lip edge 59.1. An outer perimeter of lip 51.1 is generally rectilinear in shape. The inner perimeter of lip 51.1 forms a trapezoidal shape, with a narrower portion towards the front of boiler basin 12.1. A skull 101 may be inserted with a snout towards the narrower region. In embodiments, horns 103 may rest on the inner perimeter of lip 51.1, permitting the user to properly boil the skull while maintaining the desired aesthetic appearance of the horns.

Continuing to refer to FIGS. 2E-2H, in embodiments, portable skull boiler 10.1 has a height 71.1, as measured from foot plate 41.1 to lip 73.1, between six inches and eighteen inches. In embodiments, portable skull boiler 10.1 has a height 71.1 of about nine inches. In embodiments, the boiler basin 12.1 has a boiler basin height 73.1, as measured from base 11.1 to lip 51.1, between three inches and twelve inches. In embodiments, boiler basin height 73.1 is about five inches. In embodiments, boiler basin 12.1 has a top length 75.1, as measured from a forward edge of lip 55.1 to a rearward edge of rear lip 59.1, between six inches and two feet. In embodiments, boiler basin 12.1 has a top length 75.1 of about 9.75 inches. In embodiments, rear wall 13.1 has a width 72.1, measured from left side wall 17.1 to right side wall 17.2, between four inches and twelve inches. In embodiments, rear wall 13.1 has a width 72.1 of about seven inches. In embodiments, lip 51.1 has a width 74.1, measured from an outside edge of left lip edge 55.1 to an outside edge of right lip edge 53.1, between four inches and twelve inches. In embodiments, lip 51.1 has a width 74.1 of about eight and a half inches.

Figure 2I:
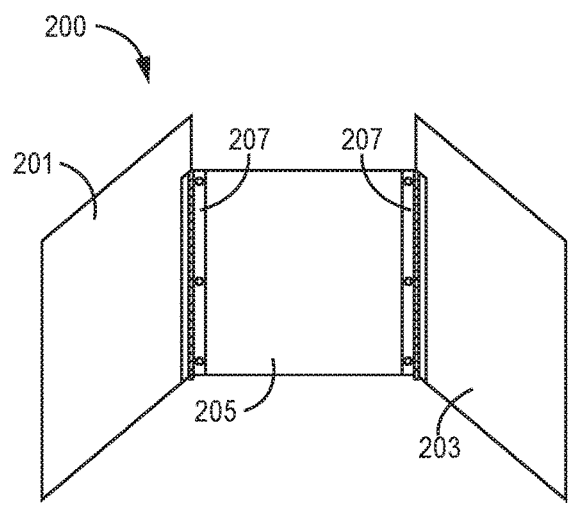
FIG. 2I is a perspective view of a wind screen according to an embodiment of the disclosure.
Figure 2J:
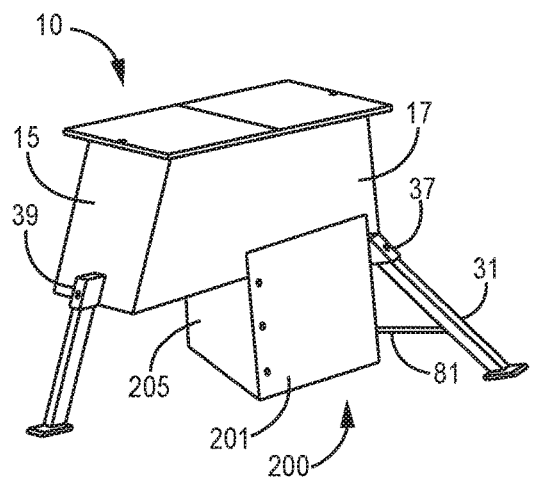
FIG. 2J is a perspective view of a wind screen positioned around a burner of a portable skull boiler.

Referring to FIGS. 2I-2J, a wind screen 200 may have a left side panel 201, a right side panel 203, and a front panel 205. In embodiments, side panels 201, 203 are of similar size and shape. Front panel 205 extends between the left and right side panels 201, 203. In embodiments, the front panel 205 and side panels 201, 203 are hingedly connected such that the wind screen may fold flat. For example, a piano hinge 207 may be used to attach left and right side-panels 201, 203 to front panel 205. In embodiments, wind screen 200 may be sized such that it fits within boiler basin 12 when folded flat. In embodiments, front panel 205 is sized such that it extends from the ground to the bottom wall 11. In embodiments, left side panel 201 is sized such that left side panel 201 extends slightly higher than, and overlaps, left side wall 17 of boiler basin 12. In embodiments, right side panel 203 is sized such that right side panel 203 extends slightly higher than, and overlaps, right side wall 19 of boiler basin 12. Wind screen 200 may comprise alumina, aluminum alloys, magnesium alloys, steel, or other sheet metals or alloys known to one skilled in the art.

Figure 3:
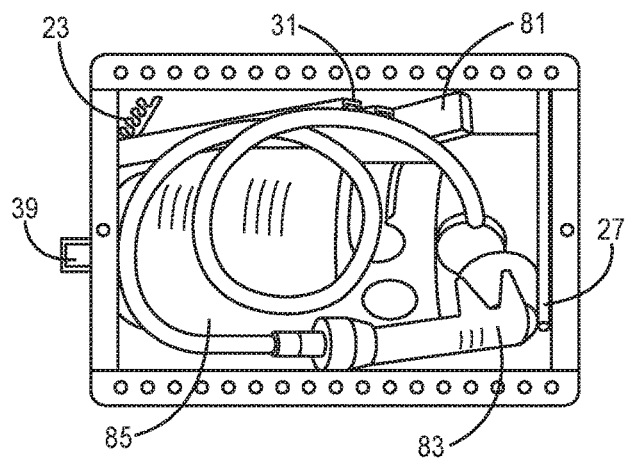
FIG. 3 is a top view of a portable skull boiler in a stowed configuration.
Figure 4A:
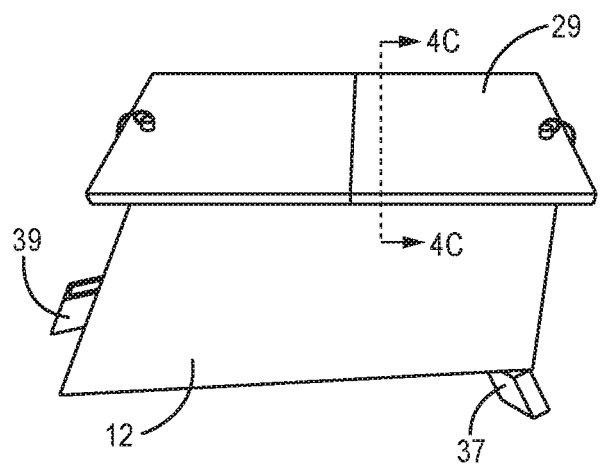
FIG. 4A is a perspective side view of a portable skull boiler in a stowed configuration with a lid.
Figure 4B:
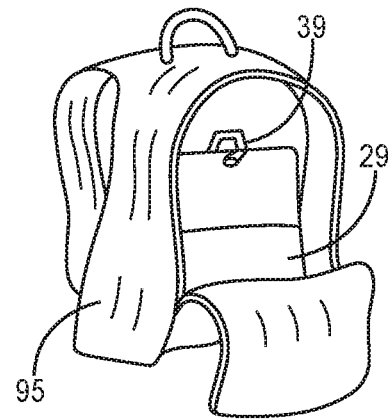
FIG. 4B is a perspective view of a portable skull boiler stowed in a bag.
Figure 4C:
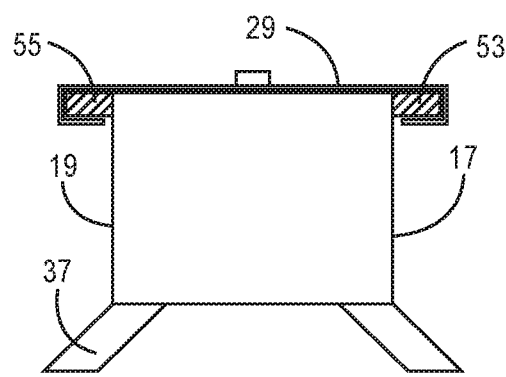
FIG. 4C is a cross-sectional view of a portable skull boiler with a conforming lid.

As depicted in FIG. 3, all removable components and propane tank 85 may be placed within boiler basin 12 in a stowed configuration. Removable components may include at least front, left rear, and right rear legs 31, 33, 35, two horn support arms 63, horn support bar 67, nose bar 27, and burner 81, and propane tank 85, in addition to any fasteners such as screws, butterfly nuts, lugs, bolts, hook and loop, washers, nuts, and the like. In embodiments, wind screen 200 may be placed within boiler basin 12 in the stowed configuration when wind screen 200 is folded. As illustrated in FIG. 4A, in the stowed configuration, lid 29 may be placed on lip 51 for convenient portability. In embodiments, lid 29 may be secured to at least one of front lip 57 or rear lip 59. In embodiments, handles allow a user to easily carry portable skull boiler 10 in the stowed configuration. As shown in FIG. 4B, portable skull boiler 10 may fit within a backpack 95 or other sack, allowing for hands-free transport while hunting. FIG. 4C illustrates a cross-section of skull boiler 10 with a lid 29 conforming to lip 51, according to embodiments. Lid 29 may have flange portions that conform to left lip edge 53 and right lip edge 55. In embodiments, lid 29 may conform to two sides of left lip edge 53 and right lip edge 55. In such embodiments, lid 29 may be set atop lip 51. In embodiments, lid 29 may conform to three sides of left lip edge 53 and right lip edge 55. In such embodiments, lid 29 may be slid into place. Once lid 29 is in place, flange portions may prevent lid 29 from easily falling off skull boiler 10. Particularly when water is boiling, this may be an important as steam pressure from the boiling water could otherwise cause lid 29 to shift.

Portable skull boiler 10 may be transitioned from the stowed configuration to a use configuration by removing lid 29 and unpacking propane tank 85 and removable components. Left rear leg 31 is inserted into and secured to a first tubular rear leg receptacle 37. Right rear leg 33 is inserted into and secured to a second tubular rear leg receptacle 37. Front leg 31 is inserted into tubular front leg receptacle 39 and secured at the desired height. Burner 83 is secured to burner arm 33. Burner 83 is attached to propane tank 85. Wind screen 200 is unfolded and positioned around burner 83 to protect the flame from the wind. A first horn support arm 63 is installed through aperture 61 across from a second horn support arm 63. Horn support bar 67 is slid through the eyelets 65 of the first and second support arms 63. One skilled in the art will recognize that the precise order of these steps is not critical to transitioning the portable skull boiler 10 from the stowed configuration to the use configuration.

Figure 5:
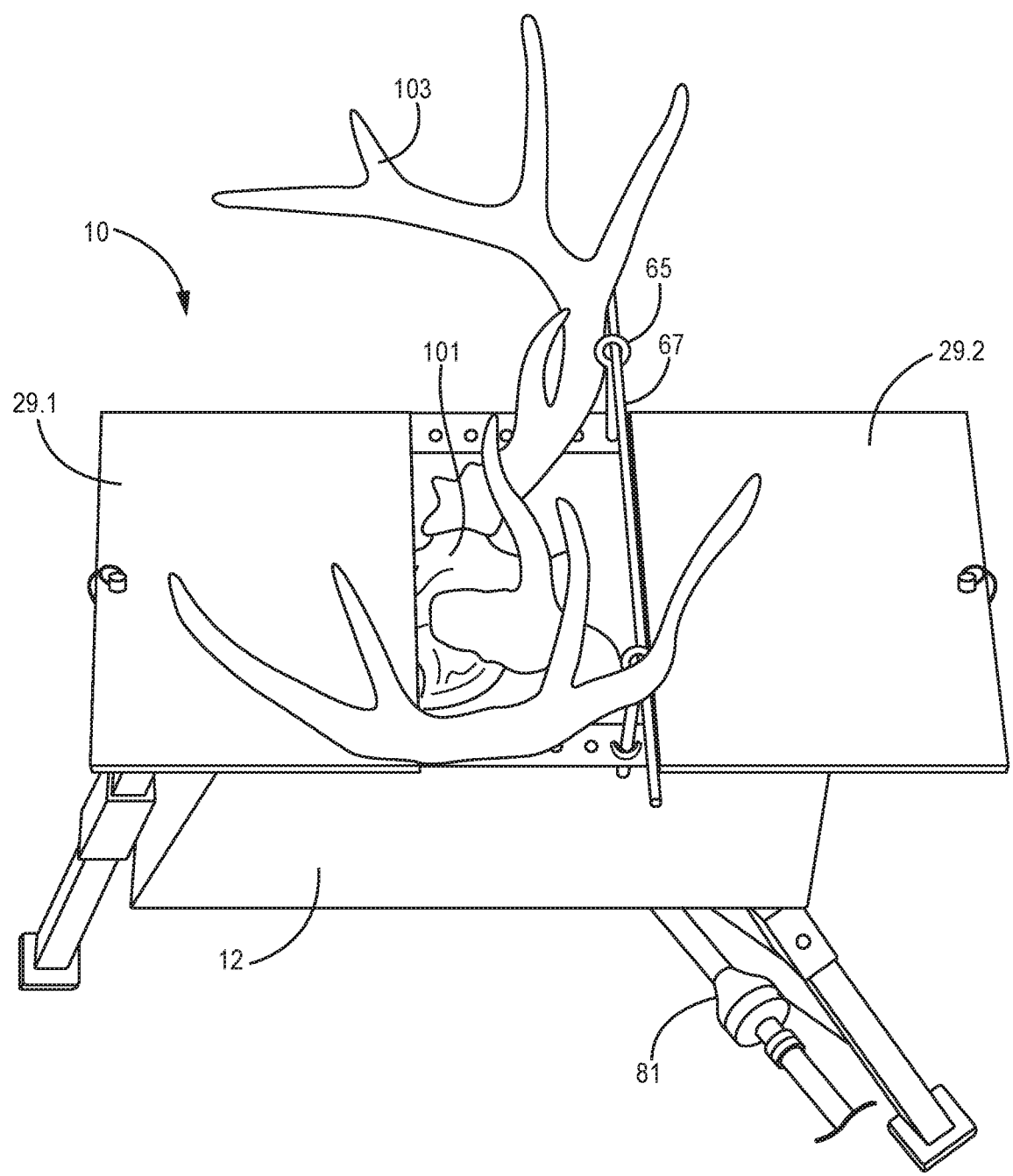
FIG. 5 is a perspective view of a portable skull boiler in a use configuration with lid panels.
Figure 6:
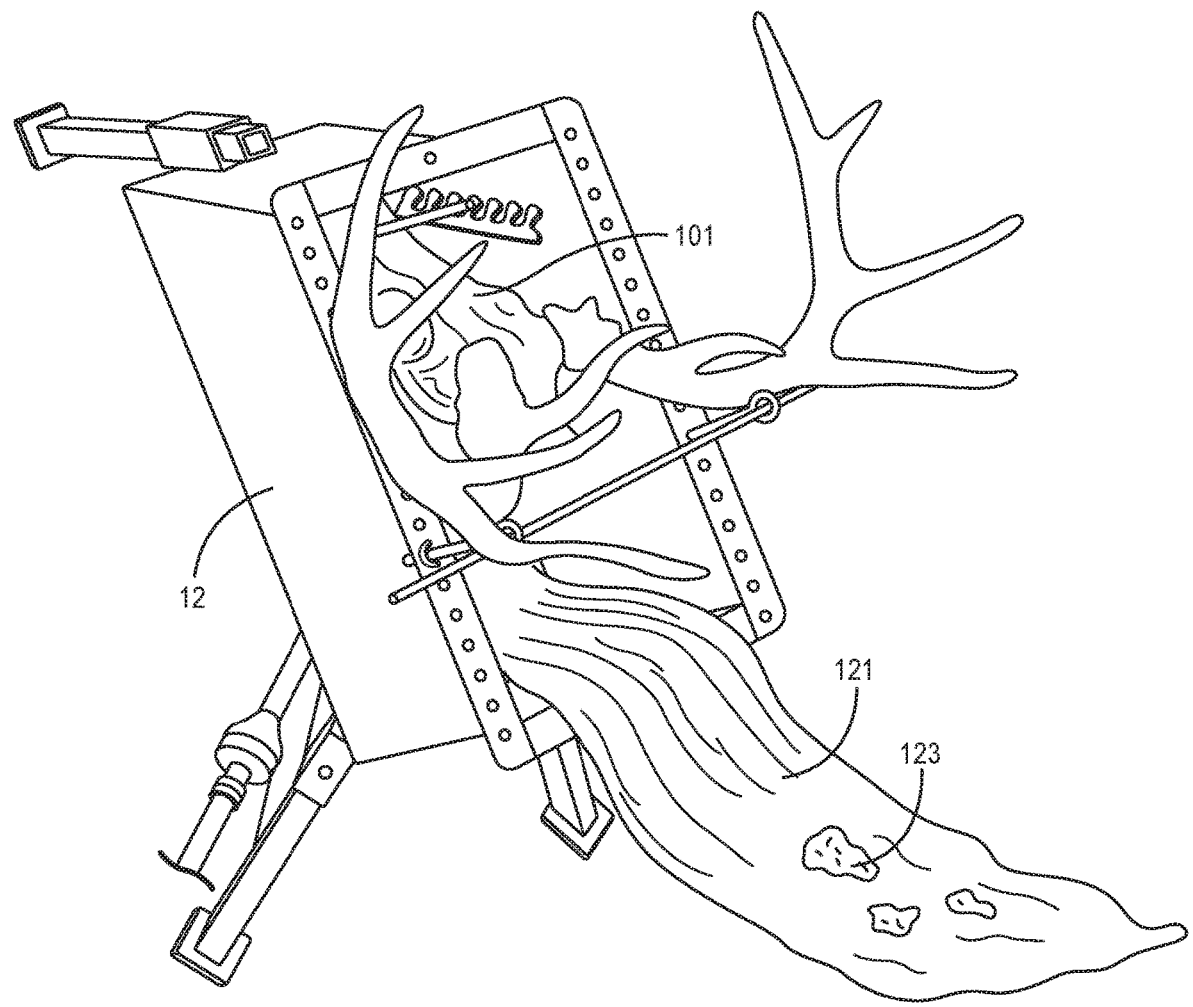
FIG. 6 is a perspective view of the contents of a portable skull boiler being dumped.
Figure 7:
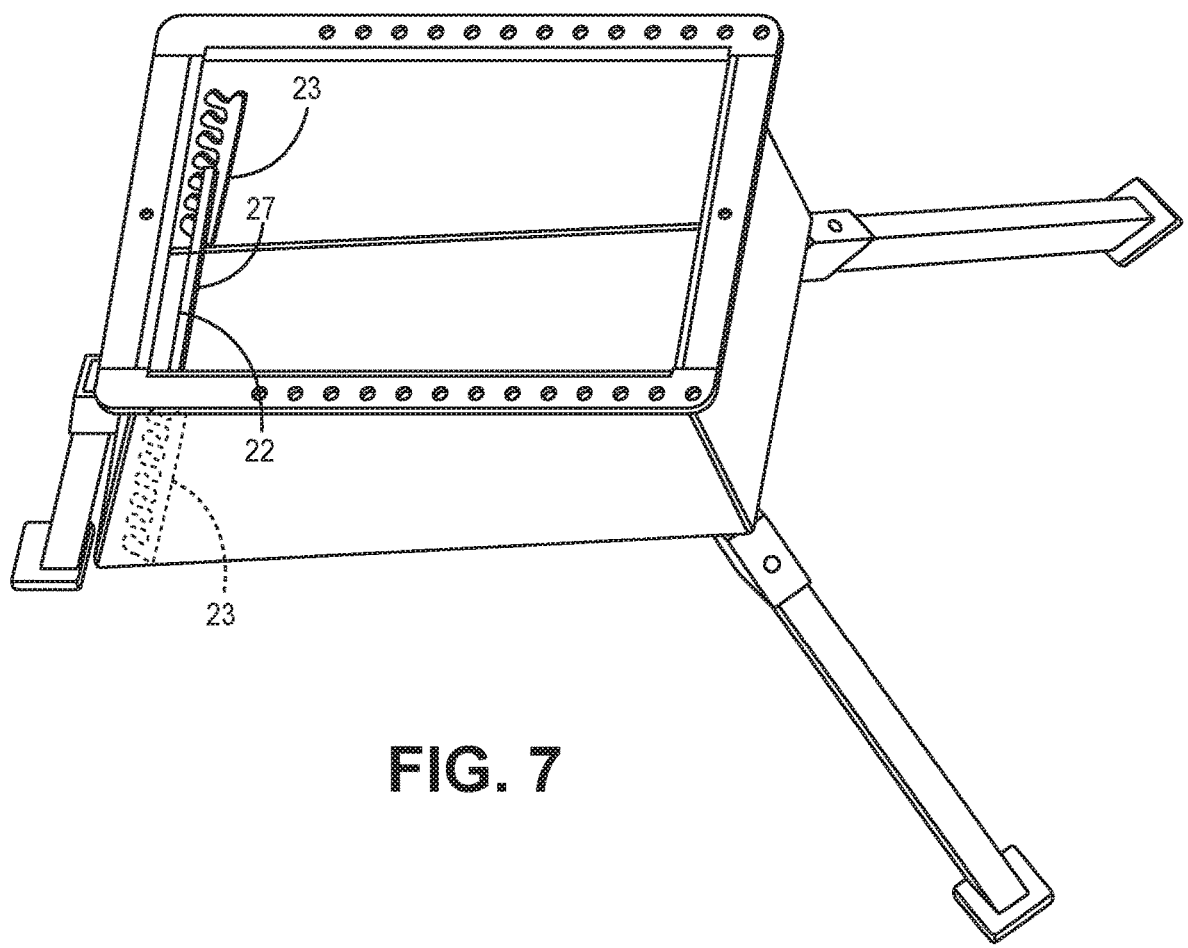
FIG. 7 is a perspective view of an empty basin with the nose hold-down.

In the use configuration, as shown in FIG. 5, a portable skull boiler 10 may be used to remove flesh from a skull. Water is placed in boiler basin 12. A skull 101 is placed in the water and submerged to the desired depth. In embodiments, a user may place a skull 101 in the boiler basin 12 before adding water. In embodiments, a user may place a skull 101 in the boiler basin 12 after adding water. In embodiments, a user may dissolve additives in the water. Examples of additives may include cleaning agents, whitening agents, disinfecting agents, flesh removing agents, detergents, peroxide solutions, and the like. In embodiments, a peroxide solution may be a 40% hydrogen peroxide solution. Soaps, such as liquid dish soaps or laundry detergents, may assist in degreasing skull 110 while boiling. A user may bring the water to a boil by turning on propane tank 85 and igniting burner 83. When flesh is removed from the skull, user may turn off propane tank 85 and remove skull 101 from boiler basin 12. User may then dispose of the remaining contents of boiler basin 12 and cleanse the portable skull boiler 10. It may be desirable to manually remove as much tissue and brain matter as possible from skull 101 prior to boiling. In embodiments, a user may remove the lower jaw prior to boiling. In embodiments, a user may boil skull 101 for some time, remove skull 101 from boiler basin 12, manually remove additional softened tissue from skull 101, and then replace skull 101 in boiler basin 12 for additional boiling. As illustrated in FIG. 6, the portable skull boiler 10 is readily emptied. A user may readily grasp a leg or an edge of the boiler basin and tip the portable skull boiler 10 such that water 121, brain matter 123, tissue, and other contents of the boiler basin 12 spill out onto the ground. The conforming shape of boiler basin 12 to skull 101, in conjunction with skull 101 being secured between nose bar 27 and horn support bar 67 prevents skull 101 from sliding out of the boiler basin 12 along with the water and other contents. In embodiments, a user may manually remove additional tissue after about one hour of boiling. In embodiments, a user may manually remove additional tissue when tissue along the nose of skull 101 starts to split and peel from the bone. Examples of tools used for manual removal of tissue include knives, wire brushes, small picks, pressure washers, and the like. In embodiments, a user may replace soiled water with clean water when placing skull 101 back in boiler basin 12 for additional boiling. User may continue the process of manually removing flesh from skull 101 and reboiling as desired.

As depicted in FIG. 5, when boiling skull 101, a user may cover a portion of boiler basin 12 with lid panels 29.1, 29.2. Lid panels 29.1, 29.2 may be adjusted such that only portions extending outward from boiler basin 12 and beyond lip 51 are exposed, such as horns 103, while keeping other portions, such as the skull 101 submerged. Covering the boiler basin 12 retains heat within boiler basin 12. Retaining heat allows the water to come to a boiler sooner and requires less propane gas consumption to maintain the water a boil. Retaining heat may also increase the temperature within the boiler basin 12, thereby reducing the time required to remove biological material from skull 101. Lid panels 29.1, 29.2 further act to reduce horns 103 exposure to boiling water and steam. Lid panels 29.1, 29.2 may be opened to release heat if water becomes too hot. A heavy boil may weaken skull 101 and/or damage the bones of skull 101. Contact with boiling water and/or steam may cause unwanted discoloration of horns 103, resulting in an aesthetically unpleasant trophy. In embodiments, a user may wrap the horns 103 or use other means to prevent contact between the horns and the water and/or steam. Once skull 101 is clean, a user may use additional agents for whitening to achieve the desired aesthetic affect. For example, a user may create a paste including crème developer and/or powder lightener. After covering skull 101 in the paste, skull 101 may be wrapped to avoid drying out. After some time, the paste may be washed from skull 101 and reapplied if a whiter effect is desired. Once skull 101 is at the desired color, it may be sealed for preservation.

What is claimed is:

1. A portable skull boiler comprising:
a boiler basin shaped to receive a male cervid head with biological matter thereupon and antlers attached, the boiler basin being elongate with a forward nose end and a rearward back-of-head end, the basin having an open interior and a lip defining an open top that is horizontal when the boiler basin is in a use position, wherein the open interior converges towards the forward nose end, whereby a reduced in size nose receiving region is provided in the boiler basin compared to the back-of-head receiving region;
a plurality of legs removably attached to the boiler basin;
a burner adjustably positionable below the basin when the basin is in a use position;
a horn support adjustably positionable and securable to the lip for positionally securing a horn of the cervid head as the horn extends upwardly from the open top.

2. The portable skull boiler of claim 1, wherein the lip has opposing lip side portions, each opposing lip side portion having a plurality of apertures for adjustably securing the horn support to each of the opposing sides.

3. The portable skull boiler of claim 1, wherein the boiler basin comprises a sloped planar bottom wall, a planar back wall, a sloped planar front wall, a left side planar wall, and a right side planar wall.

4. The portable skull boiler of claim 3, further comprising a plurality of leg receptacles that are unitary with the basin, each leg receptacle sized for receiving a support leg.

5. The portable skull boiler of claim 1, wherein when the boiler basin is in a use position, the forward nose end extends forwardly past the lip defining the open top.

6. The portable skull boiler of claim 2, wherein the lip defines a rectangular top opening, and wherein each side lip portion comprises an apertured strip portion of metal.

7. The portable skull boiler of claim 6, wherein the horn support comprises a pair of posts respectively attachable to select apertures on each of the pair of side lip portions and a bridging member that extends between the pair of posts.

8. The portable skull boiler of claim 1, further comprising a nose hold down comprising a pair of ladders on opposing side wall surfaces proximate a forward wall of the boiler, and further comprises a nose bar that extends between the pair of ladders, secured to the basin in the interior of the basin, the hold-down extending across the nose of a cervid head in the skull boiler.

9. The portable skull boiler of claim 8, wherein each ladder having a series of rungs for adjustably positioning the nose bar thereon.

10. The portable skull boiler of claim 1, further comprising a lid that is adjustably and slidably attachable to the basin at the lip.

11. The portable skull boiler of claim 1, further comprising a containment pack for the basin, and wherein the plurality of legs, the burner, the horn support, fuel for the burner, and connecting hose for the burner, are all stowed in the interior of the basin, and the basin is stowed in the pack.

12. The portable skull boiler of claim 11, further comprising a foldable metal wind shield that is stowable in the interior of the basin.

13. A method of boiling a cervid skull at a hunting location, the method comprising:
providing the portable skull boiler of claim 11;
removing the plurality of legs, the burner, the fuel for the burner, the horn support, and the connecting hose from the basin and transitioning the portable skull boiler to a use configuration;

placing a cervid animal skull in the boiler basin with the nose toward the forward nose end;

adjusting the horn support to secure the cervid horn;

filling the boiler basin with water up to a desired level; and connecting the burner to the fuel and positioning the burner below the boiler basin.

14. The method of claim 13, wherein the basin has a foldable wind shield stowable therein and the method further comprises setting up the wind shield proximate the burner.

15. The method of claim 13, further comprising securing the nose in a lower position in the interior of the boiler basin with a nose hold-down bar.

16. A portable cervid skull boiler having a use configuration and a stowed configuration, the skull boiler comprising:

a metal basin having an elongate non rectilinear shape and having a rearward back-of-head end and an opposing forward nose end, for conforming to a shape of a cervid head with horns, the basin having a plurality of leg receptacles, and an open top having a width preventing a portion of horns attached to the cervid head from entering the basin;

a basin lip at the open top of the basin;

a lid configured to be supported by the basin lip and adjustable to cover a selected portion of the open top up to the horns; and a burner adjustably positionable below the basin.

17. The portable skull boiler of claim 16 wherein the basin has a prismatic shape with a deeper forward portion with respect to the basin lip than a rearward portion.

18. A skull boiler comprising:

a boiler basin shaped to receive a male cervid head with biological matter thereupon and the antlers attached, the boiler basin being elongate with a forward nose end and a rearward back-of-head end, the basin having an open interior and a lip defining an open top that is horizontal when the boiler basin is in a use position, wherein the open interior converges towards the forward nose end;

a plurality of legs attached or attachable to the boiler basin; and wherein the boiler basin has a plurality of holes at the lip for facilitating horn support of the cervid head as the horn extends upwardly from the open top.

19. The convertible skull boiler of claim 18 wherein the basin has a front wall unitary with a pair of lateral walls, a rearward wall unitary with the pair of lateral walls, and a bottom wall unitary with the front wall, the rearward wall, and the pair of lateral walls, each of the front wall, the rearward wall, and the pair of lateral walls each having a planar exterior surface.

20. The convertible skull boiler of claim 19 wherein the front wall and bottom wall define an acute angle when measured in the interior of the basin.

\* \* \* \* \*